Figure 1:
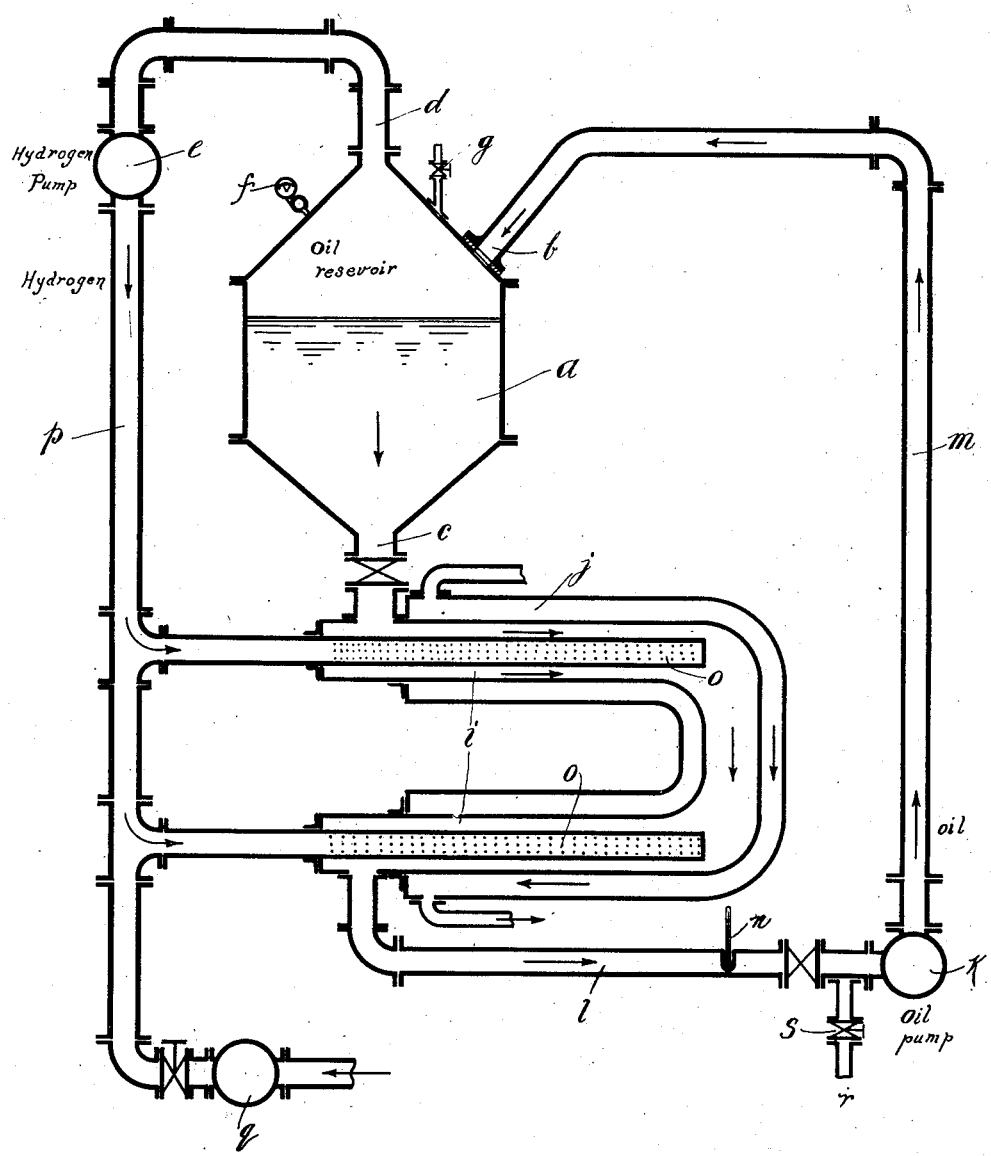

G. MARTIN.
APPARATUS FOR HYDROGENATING OILS.
APPLICATION FILED JUNE 10, 1919.

1,333,328.

Patented Mar. 9, 1920.
2 SHEETS—SHEET 1.

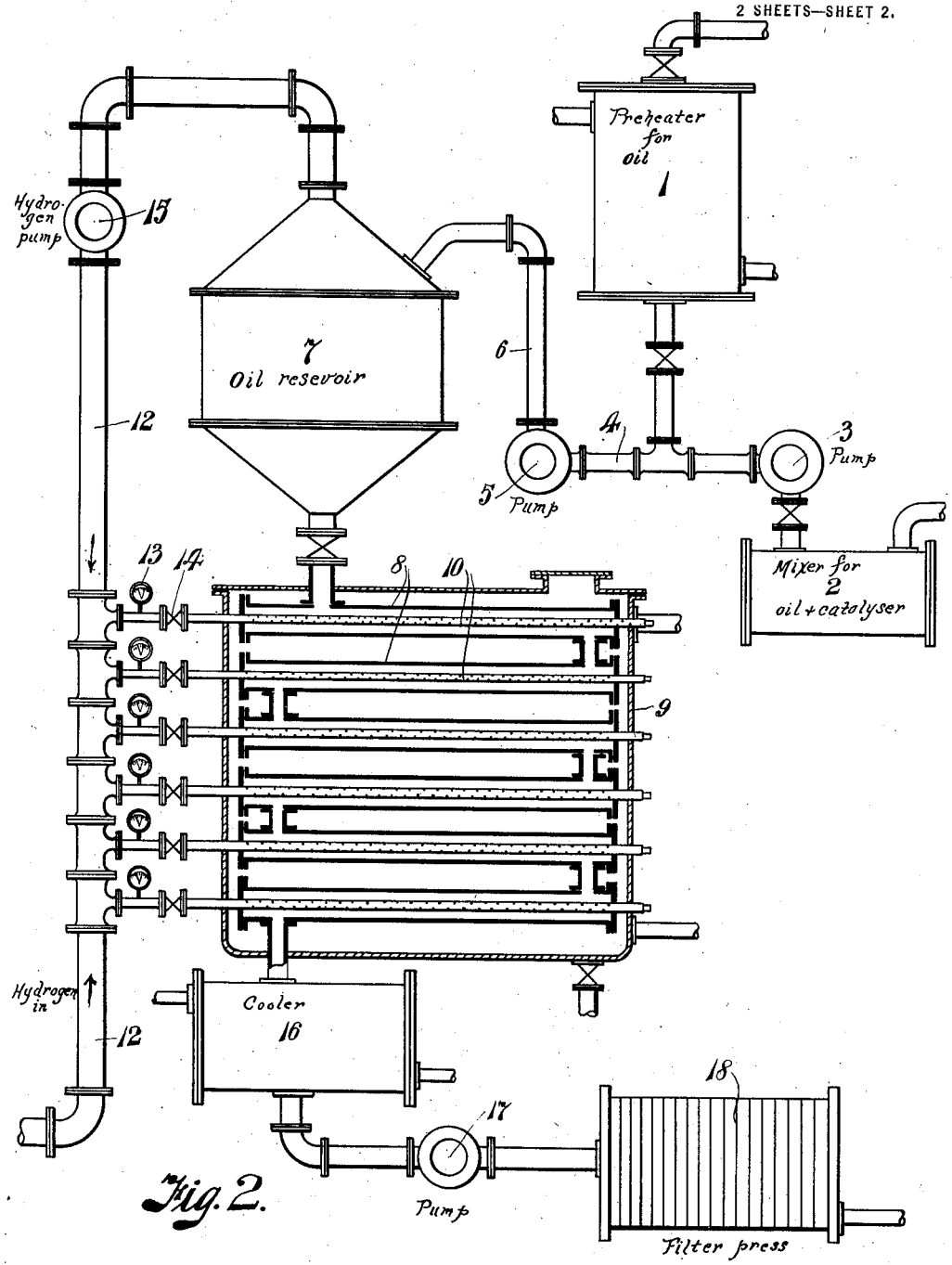

UNITED STATES PATENT OFFICE.

GEOFFREY MARTIN, OF MANCHESTER, ENGLAND.

APPARATUS FOR HYDROGENATING OILS.

1,333,328.     Specification of Letters Patent.     Patented Mar. 9, 1920.

Application filed June 10, 1919. Serial No. 303,109.

*To all whom it may concern:*

Be it known that I, GEOFFREY MARTIN, D. Sc., Ph. D., a subject of the King of Great Britain and Ireland, residing at 109 Corporation street, Manchester, England, have invented certain new and useful Improvements in Apparatus for Hydrogenating Oils, of which the following is a specification.

This invention relates to an improved apparatus for hydrogenating or hardening oil. Heretofore, processes that have been employed for the hydrogenation of oil are discontinuous and suffer therefore from the difficulties which are pertinent to a discontinuous process. For example, in ordinary processes as at present known, large masses of oil weighing a ton or more are treated in batches in massive autoclaves and are attendant with additional difficulties in stirring and mixing the oil.

The present invention has primarily for its object to provide an improved apparatus in which may be carried out a process which differs from those mentioned above in that it is continuous and therefore presents a great advance upon existing methods.

Another object of the invention is to provide means by which the oil is treated in a relatively thin stream instead of in bulk in an externally heated vessel, a very thorough admixture of hydrogen and oil being thereby produced in a short space of time accompanied by considerable economy in regard to the heating medium employed.

A further object of the invention is to obviate the necessity for baffles, stirring gear and other apparatus which must be used where oil is treated in bulk in large vessels with the result that there are fewer parts liable to get out of order while cleaning and inspection are rendered much more simple operations.

In the accompanying drawings:—

Figure 1 is a diagrammatic representation of a plant for the hydrogenation of fats, oils and the like constructed according to the invention and Fig. 2 is a diagrammatic representation of a modified form of the invention.

$a$ indicates a reservoir or vessel into which a charge of oil, which may have been preheated to a suitable temperature and which contains a suitable catalyst is introduced. The vessel $a$ has an oil inlet $b$ in its upper portion, an oil outlet $c$ at its base, and a gas outlet $d$, the latter being in circuit with a gas pump $e$ or other suitable means for extracting gas from the upper part of the vessel $a$. The vessel $a$ is also provided with a pressure gage $f$ and blow-off valve $g$.

The oil outlet $c$ is controlled by a cock $h$ and connected to a number of conduits or impregnating pipes $i$ surrounded by steam jackets $j$ or other external heating means. The conduits $i$ may be arranged in series or in parallel to the oil supply and can be disposed either vertically, horizontally, or at any angle but the oil flow should be preferably in a direction away from the vessel $a$ to a circulating pump or the like $k$ which returns the oil through pipes $l$ and $m$ to the inlet $b$ and thus maintains a circulatory system. The temperature level of the heated oil is indicated by a thermometer or thermo-indicator $n$ disposed as shown in the pipe $l$.

It will be observed that the heating of the oil is effected, not in the containing vessel as is usually the case, but by means of the heated conduits external to the containing vessel. As these conduits can be made in any number or length, heating can take place at any prearranged speed and the utilization of heat is much more rapid and economical than heating in a large externally heated vessel as in the ordinary practice.

The means employed to effect the admixture of hydrogen with the oil consist in providing every conduit $i$ with an internally projecting and perforated hydrogen supply pipe $o$ in circuit with the hydrogen gas main $p$ and preferably closed or partially closed at their ends remote from said main.

The main $p$ connects the gas outlet $d$ of the vessel $a$ with the circulating pump $e$, and also connects the pipes $o$ with a second pump $q$ for introducing fresh supplies of hydrogen. The pipe $l$ is provided with an outlet $r$ for the treated oil, controlled by a valve $s$.

The operation of an apparatus constructed according to this form of the invention is as follows:—

A constant stream of oil is caused to pass through the conduits $i$ by the pump $k$ and hydrogen under pressure from the pump $e$ is forced into the heated oil, the tendency of the gas being to bubble through the oil and escape into the vessel $a$, from which it is withdrawn by the pump $e$, a flow of hydrogen gas being thus created in minute division and in the opposite direction to the flow of oil. By this means a very intimate mixing takes place, rendering unnecessary the use of baffles, stirring gear or similar devices usually employed to achieve the same purpose in a close vessel. Further, where a number of conduits are employed, they can easily be arranged so as to be short circuited for cleansing or like purposes and their inspection or cleaning calls neither for skill nor a stoppage of the operation.

According to the modified form of the invention shown in Fig. 2, the oil to be hardened is pumped in a steady stream into a preheater 1 where it is allowed either sufficient time to become heated, the degree of heat depending upon the quality of the oil under treatment or else the flow through the preheater is of such rate that in its passage it can acquire sufficient heat. A second tank 2 is employed in which a batch of the same oil is intimately mixed with the catalyzing agent of a known type. This is also warmed and brought up to the same temperature as the oil from the preheating tank. The contents of the oil tank 2 which are heavily charged with the catalyzing agent are now pumped by a suitable form of pump 3 through a pipe 4 and caused to mingle with the oil from the preheating tank 1, both these oils after mixing being again pumped by a pump 5 or otherwise suitably elevated through a pipe 6 into a reservoir 7 at such a height that the contents of the reservoir can flow down into a series of impregnating pipes 8. These impregnating pipes 8 are disposed in a steam chest 9 or they may each be provided with interconnected steam or hot air jackets. A number of perforated gas pipes 10 are disposed within the pipes 8 and project through their ends to admit of a steady flow of hydrogen being passed to the annular space between the pipes 8 and 10 whereby the descending stream of oil is impregnated with an ascending stream of hydrogen. Hydrogen issues from a suitable reservoir and passes upwardly through a main pipe 12 connecting the end of all the perforated pipes 10 which are preferably fitted at their ends adjacent the main pipe 12 with pressure gages 13 and stop cocks 14. The main pipe 12 passes to the upper end of the reservoir 7 a pump 15 being preferably disposed at a convenient point in the length of the pipe to withdraw hydrogen which accumulates above the oil in the reservoir 7 as described in connection with Fig. 1. The impregnating pipes 8 are preferably arranged for a sinuous flow and are either of considerable length or of a very large number connected in series as shown. Within these pipes the operation of hardening takes place; the oil in a thin stream being subjected to the influence of the hydrogen, the whole of the pipes 8 being inclosed within the steam chest 9 for the purpose of maintaining the pipes at the most critical temperature for hardening. The hardened oil passes away from the impregnating system of pipes into a cooler 16 from whence it is forced by a pump 17 through a filter press 18 or centrifugal machine in order to remove catalyst and from which it emerges in its treated condition for storage purposes. The escaping hydrogen ultimately forces its way through the oil and that portion not absorbed passes into the reservoir 7 containing the mixed oils from which it is withdrawn by the pump 15 and again circulated through the impregnating system, the loss being made up from the reservoir 11. The rate at which the oil is hardened depends entirely upon the length of the impregnating pipes and the quantity of hydrogen gas it meets in passing in a film down these pipes. Consequently any degree of hardening can be regulated either by controlling the supply of hydrogen or by arranging the pipes with by-passes whereby the contents can be driven off at any convenient stage.

It is to be understood that although the term "Oil" has been used throughout this specification, liquid fats, waxes and the like are intended to be covered as describing their state under heat treatment.

I claim:

1. Apparatus for the hydrogenation of oils and the like, comprising externally heated conduits, perforated gas pipes disposed within said conduits, means for causing a current of hydrogen to issue from said pipes, and means for causing oil to flow through said conduits in a direction opposite to that of the hydrogen.

2. Apparatus for the hydrogenation of oils and the like, comprising externally heated conduits, perforated gas pipes disposed within said conduits, means for causing a current of hydrogen to issue from said pipes, means for causing oil to flow through said conduits in a direction opposite to that of the hydrogen, and means for maintaining a continuous circulation of hydrogen and oil.

3. Apparatus for the hydrogenation of oils and the like, comprising an oil reservoir, means for preheating oil supplied to said reservoir, means for introducing catalyst to the oil supplied to said reservoir, heated conduits connected to the base of said reservoir, a pump for returning oil to the upper portion of said reservoir, a hydrogen gas main connecting a number of perforated pipes within said conduits with a source of hydrogen supply and with the upper portion of said reservoir, and a pump in circuit with said gas main for maintaining the hydrogen in circulation.

4. Apparatus for the hydrogenation of oils and the like, comprising an oil reservoir, means for preheating oil supplied to said reservoir, means for introducing catalyst to the oil supplied to said reservoir, a plurality of heated conduits, means for causing oil to flow from said reservoir through said conduits, perforated pipes within said conduits, means for forcing hydrogen through said pipes to flow in a direction opposite to that of the oil, and means for withdrawing, cooling and filtering the oil treated in said conduits.

5. Apparatus for the hydrogenation of oils and the like comprising an oil reservoir, heated conduits connected to the base of said reservoir, a pump for returning oil to the upper portion of said reservoir, a hydrogen gas main connecting a number of perforated pipes within said conduits with a source of hydrogen supply and with the upper portion of said reservoir and a pump in circuit with said gas main for maintaining the hydrogen in circulation.

In testimony whereof I affix my signature in presence of two witnesses.

GEOFFREY MARTIN.

Witnesses:
 G. P. YOUNG,
 A. R. J. RAMSEY.